(12) United States Patent
Sellers

(10) Patent No.: US 6,478,292 B1
(45) Date of Patent: Nov. 12, 2002

(54) ELEVATED NON-SLIP CUTTING BOARD

(76) Inventor: Kathleen R. Sellers, 3594 S. Ocean Blvd., #301, Highland Beach, FL (US) 33487

( * ) Notice: Subject to any disclaimer, the term of this patent is extended or adjusted under 35 U.S.C. 154(b) by 0 days.

(21) Appl. No.: 09/661,072

(22) Filed: Sep. 13, 2000

(51) Int. Cl.[7] .................................................. B23Q 3/00
(52) U.S. Cl. ..................... 269/289 R; 269/285; 269/286
(58) Field of Search ........................ 248/633; 269/289 R, 269/302.1, 285, 286; 254/DIG. 1

(56) References Cited

U.S. PATENT DOCUMENTS

| | | | | |
|---|---|---|---|---|
| 3,436,042 A | * | 4/1969 | Van Goubergen | ............ 248/633 |
| 3,710,653 A | * | 1/1973 | Miller | ...................... 269/289 R |
| 4,482,592 A | * | 11/1984 | Kramer | ....................... 428/172 |
| 4,686,725 A | * | 8/1987 | Mitchell | .......................... 5/481 |
| 4,930,759 A | | 6/1990 | Potter | |
| 5,121,909 A | * | 6/1992 | Stickel, III | .............. 269/289 R |
| 5,527,022 A | * | 6/1996 | Gibson | .................... 269/289 R |
| 5,984,294 A | * | 11/1999 | Bogomolny | ............ 269/289 R |

* cited by examiner

Primary Examiner—Robert C. Watson
(74) Attorney, Agent, or Firm—Malin, Haley & DiMaggio, P.A

(57) ABSTRACT

A elevated, portable non-slip cutting board for use in cutting and supporting foodstuffs, household and miscellaneous items comprising a rigid, planar baseboard to which is fixed a traction means having at least 13 downwardly directed, spaced apart projections of such a height, width, and spatial arrangement as to provide support, stability, and the free flow of fluid underneath the cutting board and which provides enhanced traction to retard slippage of the cutting board during the cutting or support process.

20 Claims, 4 Drawing Sheets

ELEVATED NON-SLIP CUTTING BOARD

BACKGROUND OF THE INVENTION

1. Field of the Invention

This invention relates generally to a cutting board for safely supporting or cutting foodstuffs, household items and other materials. Safety results by employment of downwardly directed projections from the traction surface which sufficiently raise the cutting board off the countertop, floor or planar surface and provide gripping non-slip traction during the cutting or support process, allowing juice and other fluids to flow under the board and avoiding pooling under and around or planing of the board thereby minimizing the growth of microbes and diminishing the likelihood of a slippery and dangerous condition.

2. Description of Related Art

Cutting boards are well known in the art and are primarily designed to provide a surface on which to cut food and other materials while protecting the countertop, but most fail to provide a reliably safer device. Cutting food stuffs and other materials is a potentially dangerous task, i.e. using a sharp knife or cleaver under pressure against often times frozen, hard, or cumbersome items, often in a wet environment created from fluids seeping from items during the cutting process and invariably without use of any safety or protective equipment or gear. Foods oozing fluids when cut are frequently encountered on cutting boards. The household kitchen counter is the most frequent surface on which such cutting occurs and family members during regular day to day meal preparation are the most frequent users. This environment and type of unprotected untrained user presents a situation which demands extra safety precautions.

The structure of cutting boards known in the art either fails to address this safety hazard or incompletely or inadequately solves the problem. For example, U.S. Pat. No. 5,984,294 issued to Bodomolny discloses a cutting board with a replaceable cutting surface and traction elements in the form of rubber feet individually attached, spaced rubber treads or rubber grip fastened by adhesives or stainless steel screws on the bottom surface. Bodomolny does not teach or suggest the use of unitarily molded traction elements, parameters related to height, quantity, spacing, shape, surface area, and the overall bottom surface configuration set forth in the present invention. Planing and reduced traction resulting from fluid dynamics as related to the available space under the cutting board and traction resulting therefrom are never addressed in terms of the height, number, configuration and individual shape of the projections, on which the present invention focuses.

U.S. Pat. No. 4,930,759 issued to Potter discloses a cutting board with a spiked platform to engage and retain food to be cut, a knife blade guide, a plurality of channeled depressions on the top surface for the temporary retention of juices and food related debris as opposed to the raised bottom surface for traction and to prevent slippage created by the planing effect of accumulated fluid in direct contact with the cutting board disclosed in the present invention. Potter provides a food retaining element that applies to the item to be cut as opposed to restricting movement of the cutting board apparatus on the countertop.

U.S. Pat. No. 5,527,022 issued to Gibson discloses a rectangular cutting board with a leveling component composed of a flexible, friction, enhancing material such as rubber, located at the four corners of the board. The present invention enhances traction by increasing the number of surface area contacts with an overall plurality of flexible projections (a minimum of 13 is preferred) molded or configured, or attached as part of, and which are spatially arranged, and spaced apart over the entire underside of a traction surface, not just the four corners. The location and plurality (at least 13) of flexible friction contacts in the present invention not only enhances the ability of the cutting board to support the item placed on the board surface, which is often heavy, but also increases the traction arising from the greater number of elevating contact points and greater surface area of the projections in contact with the countertop. When there are only a few projections located only at the corners, the cutting board may actually be subject to slippage arising not only, from the minimal number and amount of surface contact area, but also from the bowing of the cutting board under the weight of the item placed on the board surface. When an item to be cut is heavy, the weight, distributed in the central most portion of the cutting board, with support only at the four corners, without additional support underneath, may actually reduce surface area contact at the corners. Center weight compression caused the supports to tilt inwardly which not only decreases the amount of friction contact but also permits fluid to flow under the projections contact thereby allowing planing to occur. This situation may even worsen when the downward cutting force adds even more non-supported force directed centrally on the cutting board.

Applicant believes that when at least 13 flexible friction contact projections providing a predetermined surface area contact are spatially arranged over the entire bottom of the traction surface and are spaced apart, the weight of the item to be cut is not only supported directly thereunder, but also, the weight of the item enhances the force of frictional contact of the projections.

Although non-slip cutting boards have long existed as butcher block countertops and similar large, heavy and stationary devices, these devices take up space, are cumbersome, and neither portable nor easily or adequately cleaned, such as in a dishwasher.

The need arises not only, for a cutting board which provides overall traction and diminishes slippage of the board, but also enhances support of food or other materials over the entire cutting surface, and is elevated to channel fluids underneath the cutting board, is portable, space saving, dishwasher safe, and more sanitary.

BRIEF SUMMARY OF THE INVENTION

The present invention provides a cutting board designed to satisfy the aforementioned deficiencies.

A food cutting board comprising an elevated, non-slip cutting and support board having a baseboard fused with or fixedly attached to and supported by a bottom traction surface having a patterned plurality of spaced apart flexible projections with flat surfaces that provide a predetermined total surface area contact which grip the countertop surface for traction and for enhanced support of food or other objects, particularly in the central portion of the cutting board during the cutting process. Due to the elevated position of the cutting and support surface created by the plurality of projections, an area underneath the cutting board exists to accommodate and channel away juices and fluids. The channels for fluids under the cutting board diminishes the likelihood of microbial growth on and around the board due to the increased flow and aeration available under the board rather than accumulating about the perimeter of the board nearer the food as is the situation when the cutting board sits flush on the countertop during use. The plurality of projections and the total surface area contact for traction reduces the likelihood of a planing effect which is more likely with no elevation of the cutting board above the countertop and/or friction contact projections located at only the four corners of the underside of the cutting board. The chance of slippage and potential for physical injury is reduced when planing is avoided. The elevation is such as to allow free flow of fluid and air thereunder but not so high as to complicate use or create instability.

This cutting board for inhibiting movement or slippage on the countertop, comprises a rigid, durable, flat, planar baseboard with an overlying, abutting, flexible bottom traction surface with downwardly directed, spaced apart projections of equal height, but which may be of equal or variable size and shape and which extend over substantially the entire bottom traction surface.

The preferred shape of the baseboard and traction surface is substantially rectangular, however any geometric shape, e.g. hexagonal, octagonal, circular, oval, triangular, rhomboidal, free form shape or shape designed to resemble animate or inanimate objects, could be used so long as sized to accommodate the material to be cut or supported.

A plurality of projections having substantially flat bottoms, preferably integrally molded and directed downwardly from the underside of the traction surface are of a height to allow sufficient fluid flow underneath while maintaining stability and ease of use. These projections are situated and spatially arranged uniformly or sporadically over substantially the entire underside of the traction surface in a manner that fosters stability and the free flow of fluid thereunder. The projections are preferably flat topped, cubic, truncated cone, pyramidical columnar, hemispherical, discoidal, polyhedral, discoidal, cylindrical, or in the form of longitudinal concentric or spiral ridges, or other 3-dimensional geometric or free form shape, configuration and dimension to elevate the baseboard off the support surface while providing support, traction and flow through spaces thereunder and a predetermined contact surfaced area available to engage the countertop.

An elevated, non-slip cutting board assembly which is composed of a durable, continuous, flat planar, rigid body having an upper surface suitable for engagement with a knife or other cutting blade and a base having a substantially planar cutting surface and an underlying, abutting traction component of shape and size identical to the baseboard. The traction component is comprised of a planar top surface and bottom surface having at least 13 downwardly directed, spaced apart projections of equal height, spatially arranged over and emanating from the bottom of the traction component and extending substantially out to and along the perimeter of said cutting board.

The spaced apart projections support and elevate the cutting board body above the countertop providing sufficient air channels under the cutting board to allow fluid to flow underneath the cutting board. The projections are spatially arranged over substantially the entire underside of the traction surface to provide a predetermined minimum amount of surface area engagement with a countertop surface for greater support and enhanced frictionally gripping of the cutting board with the countertop.

A more specific characterization of the present invention is that of an elevated, non-slip cutting board which is composed of a rectangular, substantially flat, polyethylene baseboard and an underlying, abutting flexible silicon bottom traction element of a shape substantially identical to the baseboard. The traction component has top and bottom flat surfaces. From the bottom surface of the traction component emanates a plurality of downwardly directed, spaced apart octahedron shaped projections of equal height, spatially arranged thereon and extending substantially to and along the perimeter of the cutting board. The total combined surface area of contact of the projections with the countertop as compared to the amount of overall planar area of the cutting board is between, 3:4 and 1:10. The cutting board further includes a human hand-sized opening for use as a handle for carrying, hanging, and stabilizing the cutting board during use.

It is a general object of the present invention to provide a portable, dishwasher safe, elevated cutting board supported thereunder by a plurality of projections which grip the countertop, channel juices and excess fluids thereunder, provide greater support, reduce slippage, minimize the likelihood of microbal growth thereon or around, and which does not mar the countertop or surface on which the cutting board rests.

In accordance with these and other objects which will become apparent hereinafter, the instant invention will now be described with particular reference to the accompanying drawings.

DESCRIPTION OF THE PREFERRED EMBODIMENTS

Figure 1:
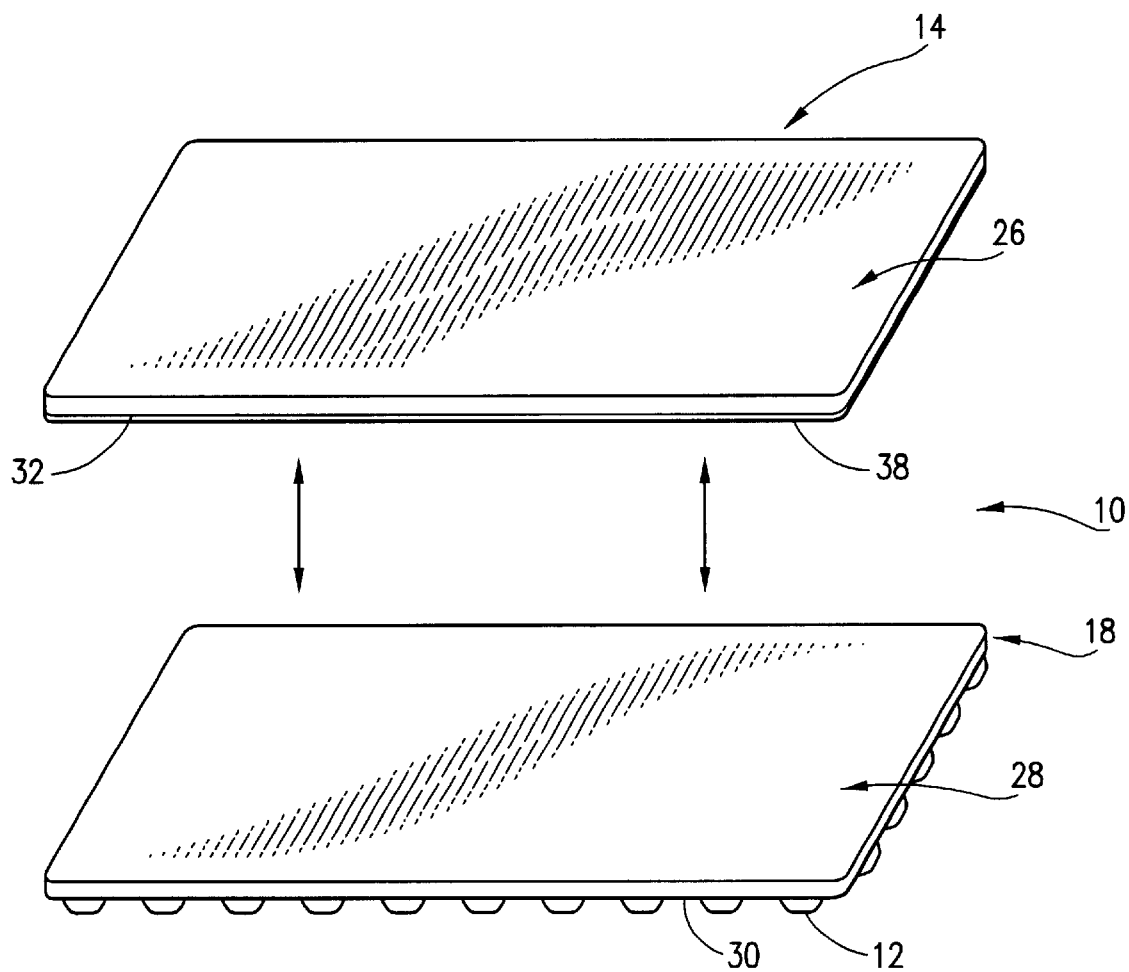
FIG. 1 shows an exploded perspective view of the present invention.

Referring now to the drawings which illustrate the preferred embodiment, FIG. 1, shows an exploded perspective view of the cutting board assembly shown generally at 10 which includes a baseboard 14, having a durable, rigid, substantially smooth, continuous, flat cutting surface 26 and smooth planar opposite bottom surface 32 for receiving the smooth, planar top side 28 of the flexible traction element 18 having an underside 30 with downwardly directed, spaced-apart flexible projections 12. The flexible traction element 18 with projections 12 is preferably unitarily molded, however, the projections 12, may be individually fixedly attached to the resilient, flexible traction element 18 such as by glue or heat. The baseboard bottom surface 32 and the top side 28 of traction surface 18 are of suitable size, shape, and surface texture as to receive each other in an abutting, layered fashion and with perimeter edges flush when affixed adjacent each other either by adhesive 38, by screws, bolts, clamps, heat fused or other waterproof or mechanical attaching means. The baseboard is formed of a substantially rigid, water proof, non-or minimally porous, heat resistant durable material such as wood, rubber, plastics, acrylics, silicone, polyolefins e.g. polyethylene and polypropylene, vinyls, olefins, polymers, styrenes, or a laminate of these materials, or other durable material which is approved for use in the food industry, but preferably polyethylene. The baseboard although preferably substantially rectangular in shape may also be substantially any geometric shape e.g., octagonal, hexagonal, diamond, circular, oval, triangular, or free form shape or even shaped to resemble animate or in animate objects.

Figure 2:
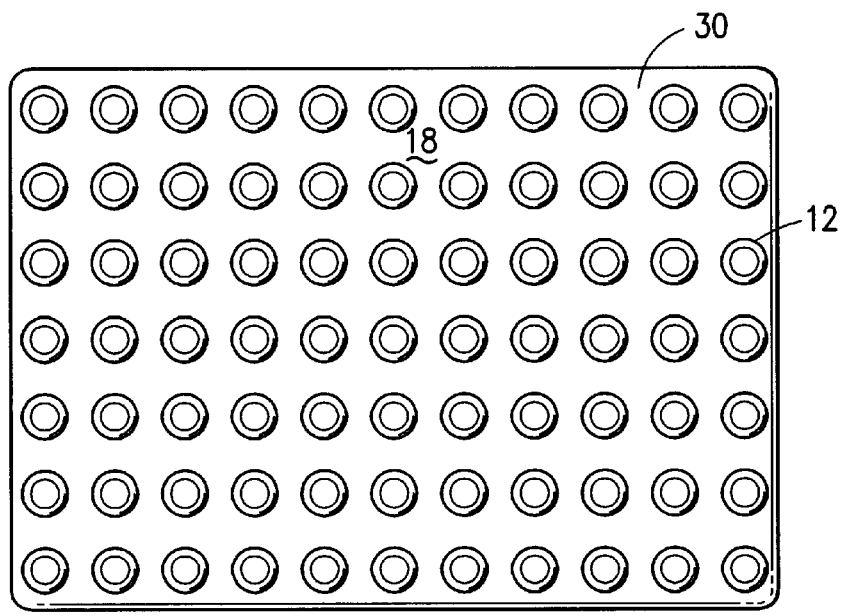
FIG. 2 shows a bottom plan view of the underside of the traction component in one embodiment of the present invention.
Figure 4:
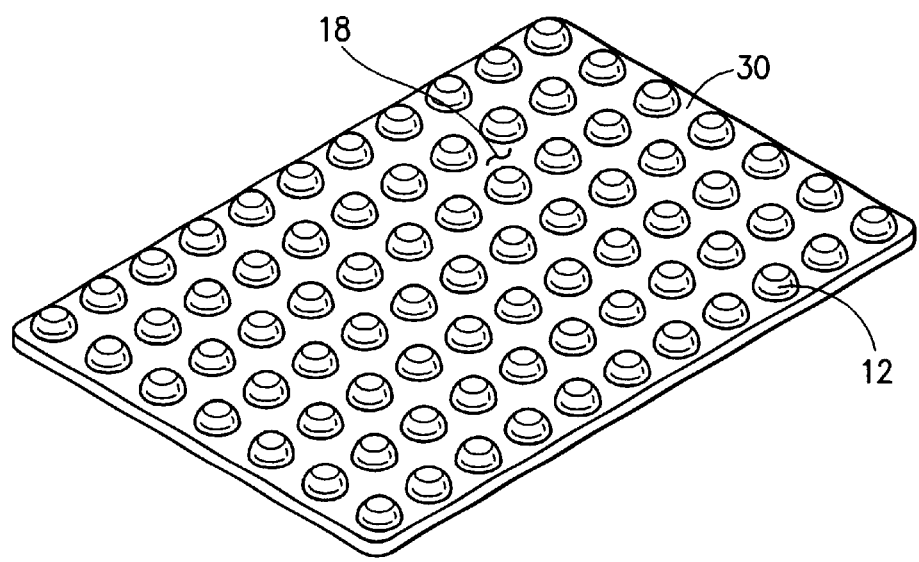
FIG. 4 shows a perspective view of the same embodiment shown in FIGS. 1, 2, and 3.

FIGS. 2 and 4 provide two views of the traction component shown with truncated hemispherical projections 12 in bottom plan view and perspective view respectively. The present invention, however, is not intended to be limited to this shape alone and should only be limited by the boundaries in the claims.

Figure 3:
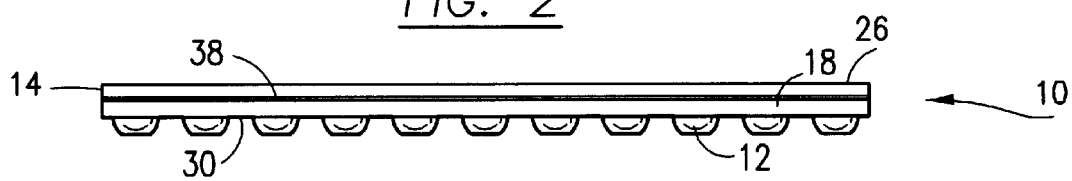
FIG. 3 shows a side elevation view of the same embodiment of the cutting board shown in FIG. 2.

FIG. 3 shows a side elevation of the cutting board 10 showing truncated hemispherical projections emanating from the underside 30 of traction surface 18. The baseboard 14 fits flush with adhesive 38 attaching traction element 18 to form the complete cutting board 10. Said traction element is a unitarily molded flexible material, such as plastics, polyolefins e.g. polyethylene and polypropylene, silicone, vinyls, or natural or synthetic rubber which is capable of frictionally adhering to a countertop or other planar surface with sufficient drag or gripping ability as to prevent sliding or slipping, but not so as to mar the countertop or planar surface. Silicone is preferred because it is flexible and resistant to the heat level commonly encountered in dishwashers. From the underside 30 of traction surface 18 emanates at least thirteen projections 12, downwardly directed, with spaces between said projections uniformly or sporadically arranged over substantially the entire bottom surface 30 of said traction surface 18. Thirteen projections are believed to provide the minimum amount of surface area in contact with a countertop which would grip the countertop adequately by increasing the amount of actual contact surface area while allowing channeled fluid flow thereunder. The projections also preferably extend substantially out to and along the perimeter of the cutting board to provide enhanced stability of the cutting board at the edges The height of and space between the projections is such as to permit the flow of juices and other liquids under the cutting board and between the projections lessening the likelihood of planing which is frequently seen when the entire planar surface of the cutting board is in direct contact with a wet environment as commonly exists when cutting of foodstuffs.

The range of preferred height of the projections is between about 2.0 mm and 1.0 cm, and spaced apart at distances ranging between about 2.5 mm and 5 cm.

Figure 5:
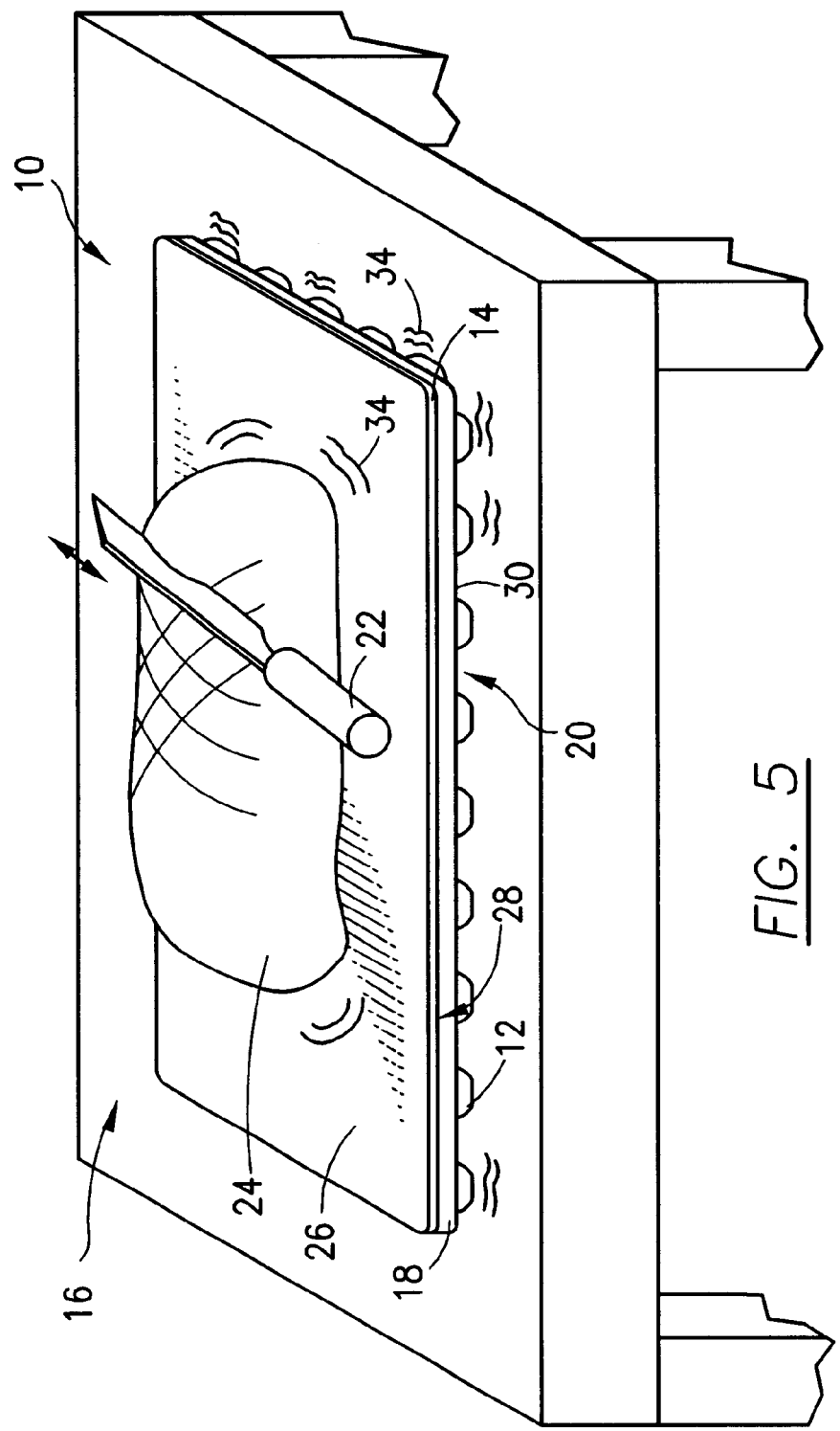
FIG. 5 shows a perspective view of the embodiment of FIGS. 1–4 of the present invention in use.

FIG. 5 discloses the cutting board 10 in use cutting meat 24 with knife 22. The cutting surface 26 of baseboard 14 is raised up above the countertop 16 leaving airspace 20 between the countertop and underside 30 of traction surface 18 to accommodate and channel away juices or liquid 34. The projections 12 are of sufficient height and width (overall contact surface area) to adequately grip the countertop or other support surface to avoid slippage and planing of the cutting board on the film of liquid 34. The plurality of projections 12 preferably extend over particularly the central portion of the underside 30 of the traction surface 18, for support and substantially out to the edges, for stability. The projections 12 can be arranged thereon in a linear pattern, a specific design, longitudinally, concentrically, diagonally or any free form configuration. The cutting board 10 is not screwed, nailed or otherwise anchored to the countertop, floor or other fixed location, so it can be easily lifted from the supporting surface when the need is satisfied or work is finished. The cutting or support board can then be satisfactorily and easily cleaned by hand or in a dishwasher, requires no disassembly, and can be easily stored or transported to the desired location.

The cutting surface 26 of baseboard 14 is preferably pebbled or textured, but may also be completely smooth, however smooth may not be as safe as a cutting surface of the pebbled or textured variety. The traction surface 18 is preferably flexibly smooth. The flexibility allowing for a gripping action of the projections at the surface on which the cutting board rests while in use. The length, width and overall shape of the baseboard and traction surface is preferably identical so as to create a smooth, flush well-fitting edge around the perimeter of the cutting board. The preferred baseboard dimensions are approximately 5 to 18 inches wide, approximately 7 to 20 inches in length, and approximately 0.25 inch to 0.75 inch thick. Most preferred approximate dimensions of the cutting board are 8 inches wide, 11 inches long and 0.45 inches thick. The traction surface is preferably not as thick as the baseboard, however, the traction surface could be equal to or greater in thickness than the baseboard. The preferred thickness of the traction means 18 including projections 12 being 0.2 inch. The baseboard and traction means are constructed preferably by injection molding, thermo-forming, or vacuum-forming, however, other methods known in the art could be used to formulate each of them into unitary structures or the two unitarily molded/fused together as one unit without the need for adhesive, screws, or other bonding means. The traction surface 18 is constructed of more flexible material than the baseboard. The baseboard 14, traction surface 18, and projections 12 can be clear, opaque colorless, mottled, colored, patterned, or designed and shaped to resemble, coordinate with, or match the décor, subject matter or theme.

The projections 12 are preferably polyhedral e.g. tetrahedron, pentahedron, octahedron, hexahedron, and or hemispherical, but may also be columnar, pyramidal, cylindrical, truncated cone, cubic, discoidal, free form or comprised of longitudinal, concentric or spiral ridges so long as they are of uniform height to insure stability and a substantially level cutting surface. It is believed that flat-topped projections, regardless of overall shape, provide more traction to the cutting board and are therefore preferred. FIGS. 1, 2, 3, 4 and 5 show truncated hemispherical projections, however, alternative embodiments are shown in FIGS. 6, 7, 8, and 9 as well as others disclosed herein, but which are not reflected in the drawings.

Whatever size or number of projections are utilized, it is believed that the greater the number of projections or a smaller number of projections with greater individual amount of actual surface area contact with countertop or support surface, the more gripping action there will be so long as spaces for fluids to flow remain between the projections. The plurality of and spaced arrangement of the projections over substantially the entire underside of the traction surface provides more physical support of the cutting board during forceful cutting which is customarily performed within the center most portion of the cutting surface. It is estimated that the ratio of the projections' surface area contact compared to the overall outside dimensional area (length times width) of the flexible traction surface is in the range of about 3:4 to 1:200 but preferably between 3:4 and 1:10.

It is important that the height of the projections be such that they serve to elevate the cutting board sufficiently above the countertop or support surface so that most fluids can flow easily under the cutting board.

Figure 6:
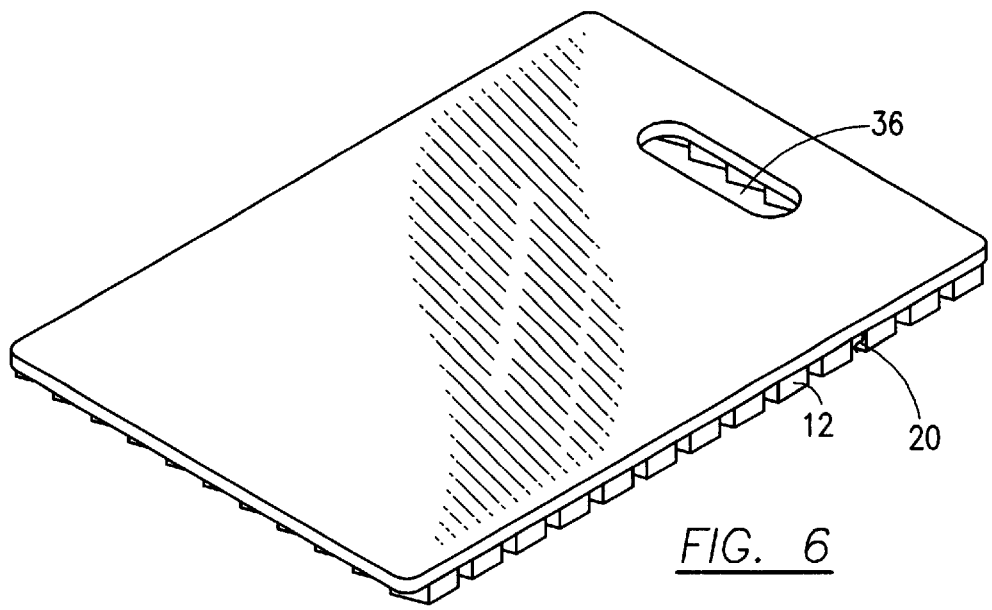
FIG. 6 shows a perspective view of a second embodiment of the present invention.
Figure 7:
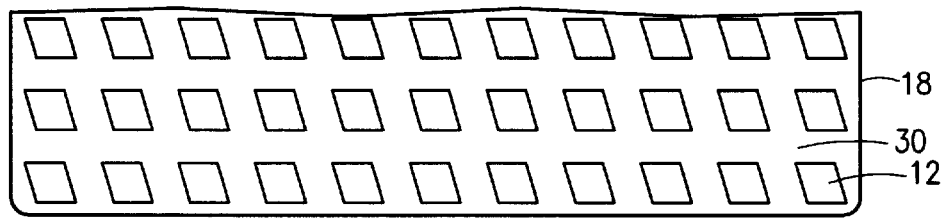
FIG. 7 shows a partial bottom plan view of third embodiment of the present invention.

The cutting board preferably contains an opening 36 which extends through the baseboard 14 and the traction surface 18, of a shape and size sufficient to accommodate the grasp of a human hand as shown in FIG. 6. This opening should be situated so as to be used as a handle, for hanging, for carrying or for stabilizing the cutting board. The projections in perspective view in FIG. 6 and in partial bottom plan view in FIG. 7 are tetrahedral.

Figure 8:
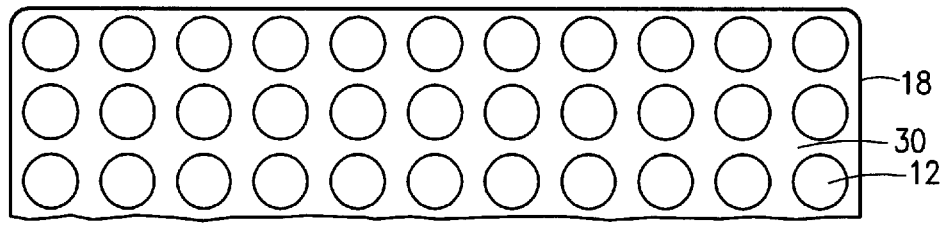
FIG. 8 shows a partial bottom plan view of the underside of third embodiment of the present invention.

FIG. 8 is a partial bottom plan view of a third embodiment wherein the projections 12 are discoid or cylindrical in shape.

Figure 9:
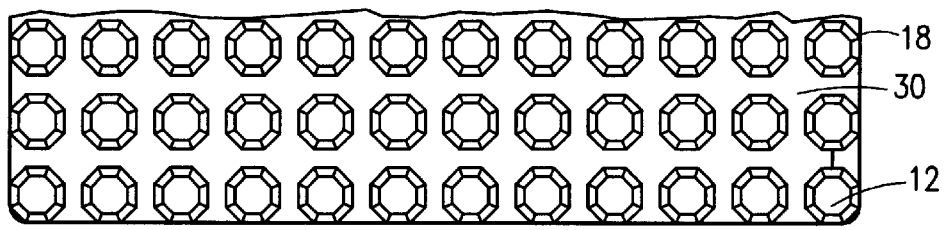
FIG. 9 shows a partial bottom plan view of the underside of fourth embodiment of the present invention.

FIG. 9 is a partial bottom plan view of yet a fourth embodiment of the present invention showing the underside 30 of the traction element 18 with faceted octahedral shaped projections 12.

Figure 10:
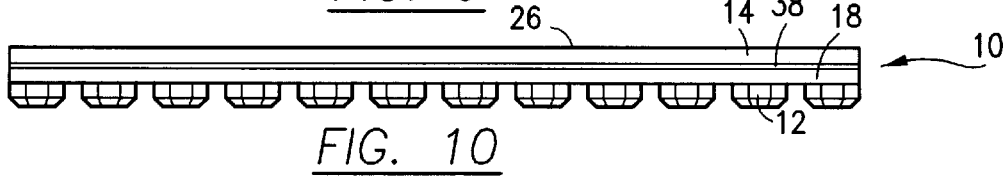
FIG. 10 shows a side elevation view of the fourth embodiment of the cutting board shown in FIG. 9.

FIG. 10 is a side elevation the present invention with faceted octahedral projections shown in partial bottom plan in FIG. 9.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An elevated, non-slip cutting board assembly comprising:
    a rigid, durable baseboard having a substantially flat cutting surface;
    a means for generating traction connected to one side of said baseboard, comprising a planar top surface and bottom surface having at least a plurality of downwardly directed, spaced apart projections of equal height, spatially arranged over said bottom surface and extending substantially out to and along the perimeter of said cutting board providing a predetermined surface area for traction.

2. The cutting board of claim 1 wherein the ratio of the contact surface of the projections with the countertop to the total outside dimensional area of the cutting board is in the range of about 3:4 to 1:200.

3. The cutting board of claim 2 wherein said baseboard is comprised of a polyolefin.

4. The cutting board of claim 2 wherein said baseboard is comprised of polyethylene.

5. The cutting board of claim 2 wherein said traction means is comprised of silicone.

6. The cutting board of claim 5 wherein the shape of said baseboard is geometric.

7. The cutting board of claim 5 wherein the shape of said baseboard is substantially rectangular.

8. The cutting board of claim 7 further comprising an opening therethrough of a size and shape to accommodate the grasp of a human hand and situated so as to be used as a handle for hanging, for carrying, or for stabilizing said cutting board.

9. The cutting board of claim 7 wherein the shape of the projections is polyhedral.

10. The cutting board of claim 7 wherein the overall dimensions of said cutting board are between 5 inches and 18 inches in width, 7 inches and 20 inches in length, and 0.25 inch and 0.75 inch in thickness.

11. The cutting board of claim 10 wherein the height of said projections ranges between about 2.0 mm and 1.0 cm and the distance between said projections ranges from about 2.5 mm to about 5 cm.

12. The cutting board of claim 5 wherein the shape of said projections is truncated hemispherical.

13. The cutting board of claim 5 wherein the shape of said projections is octahedral.

14. The cutting board of claim 2 wherein said baseboard is composed of polypropylene.

15. The cutting board of claim 4 wherein said traction means is comprised of natural or synthetic rubber.

16. The cutting board of claim 5 wherein the shape of said projections is cylindrical.

17. An elevated, non-slip cutting board comprising:
    a rectangular baseboard having a substantially planar cutting surface;
    an underlying, abutting flexible, silicon traction means having shape and perimeter dimensions identical to the baseboard and consisting of a planar top surface and a bottom surface having at least 13 downwardly directed, spaced apart projections of equal height, wherein the ratio of contact surface area of the projections with the countertop compared to the total perimeter dimensional area of the cutting board is between about 3:4 and 1:10, said projections being spatially arranged over substantially the entire bottom surface of said traction means and extending substantially to the perimeter of said cutting board and having an opening therethrough of a size and shape to accommodate the grasp of a human hand.

18. The cutting board of claim 17 wherein said baseboard is comprised of polypropylene.

19. The cutting board of claim 17 wherein said baseboard is comprised of polyethylene.

20. The cutting board of claim 19 wherein said projections are octahedral shaped.

* * * * *